United States Patent
Lee et al.

(10) Patent No.: US 7,625,670 B2
(45) Date of Patent: Dec. 1, 2009

(54) CATHODE MATERIAL FOR SECONDARY BATTERIES WITH NON-AQUEOUS ELECTROLYTE, A PROCESS FOR PREPARING THE CATHODE MATERIAL AND LITHIUM SECONDARY BATTERY CONTAINING THE SAME

(75) Inventors: Young Ki Lee, Kyoungsangbuk-do (KR); Dong Hak Kwak, Kyoungsangbuk-do (KR); Hui Chan Yun, Daegukwangyeok-si (KR); Jong Seob Kim, Daejeonkwangyeok-si (KR)

(73) Assignee: Ecopro Co. Ltd., Cheongwon-gun (KR)

( * ) Notice: Subject to any disclaimer, the term of this patent is extended or adjusted under 35 U.S.C. 154(b) by 370 days.

(21) Appl. No.: 11/371,595

(22) Filed: Mar. 9, 2006

(65) Prior Publication Data

US 2006/0204851 A1    Sep. 14, 2006

(30) Foreign Application Priority Data

Mar. 11, 2005    (KR) .................... 10-2005-0020601

(51) Int. Cl.
*H01M 4/00* (2006.01)
*H01M 4/50* (2006.01)
*H01M 4/58* (2006.01)

(52) U.S. Cl. .................. 429/223; 429/224; 429/231.95; 429/218.1

(58) Field of Classification Search .................. 429/223, 429/232, 231.2
See application file for complete search history.

(56) References Cited

U.S. PATENT DOCUMENTS

| | | | | |
|---|---|---|---|---|
| 5,914,094 A | * | 6/1999 | Sun et al. ................. | 423/594.4 |
| 2002/0031694 A1 | | 3/2002 | Van Berkel et al. | |
| 2005/0175897 A1 | * | 8/2005 | Jung et al. ................. | 429/223 |

FOREIGN PATENT DOCUMENTS

| | | |
|---|---|---|
| JP | 8-213015 | 8/1996 |
| JP | 11-45716 A | 2/1999 |
| KR | 10-2004-20884 A | 3/2004 |
| KR | 10-2004-95837 A | 11/2004 |
| WO | 2006/095957 A1 | 9/2006 |

OTHER PUBLICATIONS

International Search Report in counterpart International Application No. PCT/KR2005/004594, dated Mar. 29, 2006.

* cited by examiner

*Primary Examiner*—Dah-Wei D Yuan
*Assistant Examiner*—Zachary Best
(74) *Attorney, Agent, or Firm*—Summa, Additon & Ashe, P.A.

(57) ABSTRACT

Provided are a cathode active material for a non-aqueous electrolyte lithium secondary battery, a process for preparing the same and a lithium secondary battery comprising the same. The cathode active material for a non-aqueous electrolyte lithium secondary battery is represented by the formula $Li_aNi_{1-(v+w+x+y+z)}Mn_vCo_wM_xM'_yM''_zO_2$ wherein M, M' and M'' are independently selected from the group consisting of Al, Mg, Sr, Ca, P, Pb, Y and Zr, and mixtures thereof, a is in a range of 0.9 to 1.05, $1-(v+w+x+y+z)$ is in a range of 0.685 to 0.745, v is in a range of 0.05 to 0.06, w is in a range of 0.20 to 0.24, and x+y+z is in a range of 0.005 to 0.015.

10 Claims, 1 Drawing Sheet

CATHODE MATERIAL FOR SECONDARY BATTERIES WITH NON-AQUEOUS ELECTROLYTE, A PROCESS FOR PREPARING THE CATHODE MATERIAL AND LITHIUM SECONDARY BATTERY CONTAINING THE SAME

FIELD OF THE INVENTION

The present invention relates to a cathode active material for a lithium secondary battery, a process for preparing the same and a lithium secondary battery comprising the same. More specifically, the present invention relates to a cathode active material for a lithium secondary battery having superior charge/discharge characteristics, high rate characteristics and thermal stability characteristics and a process for preparing such a cathode active material having a specific composition.

A cathode active material for a non-aqueous electrolyte lithium secondary battery in accordance with the present invention is a lithium/nickel/cobalt/manganese complex metal oxide represented by $Li_aNi_{1-(v+w+x+y+z)}Mn_vCo_wM_xM'_yM''_zO_2$ wherein M, M' and M" are independently selected from the group consisting of Al, Mg, Sr, Ca, P, Pb, Y and Zr and mixtures thereof, a is in a range of 0.9 to 1.05, 1−(v+w+x+y+z) is in a range of 0.685 to 0.745, v is in a range of 0.05 to 0.06, w is in a range of 0.20 to 0.24, and x+y+z is in a range of 0.005 to 0.015.

BACKGROUND OF THE INVENTION

Recently, a trend toward miniaturization and slimness in portable electronic instruments such as mobile phones, notebook computers, PDAs and the like has raised a need for realization of high capacities in lithium secondary batteries which are used as an energy source for such portable instruments. Lithium/cobalt complex oxides, commercially available at present, can be relatively easily synthesized and exhibit superior safety and charge/discharge cyclability, but have reached their uppermost limit of capacity, thus presenting problems associated with limitations to achieve higher capacity of batteries.

As such, a lithium/manganese complex oxide ($LiMnO_2$ or $LiMn_2O_4$) using inexpensive manganese (Mn) or a lithium/nickel complex oxide using nickel (Ni) thus receives a great deal of attention as a replacement for a lithium/cobalt complex oxide. Among these, the lithium/manganese complex oxide having a layered-structure is advantageous in that it has a much higher capacity than the lithium/cobalt complex oxide, but suffers from an unstable structure and thus poor charge/discharge cyclability. Whereas, a spinel lithium/manganese complex oxide has an excellent thermal stability, but exhibits a lower capacity than the lithium/cobalt complex oxide, thus leading to difficulty in application thereof to high-capacity batteries.

Meanwhile, the lithium/nickel complex oxide is a high-capacity material, but suffers from problems such as inferior charge/discharge cyclability and difficulty in preparation thereof. In order to solve such disadvantages, Japanese Patent Publication No. Hei 8-213015 has proposed $Li_xNi_aCO_bM_cO_2$ wherein x is in a range of 0.8 to 1.2, a is in a range of 0.01 to 0.99, b is in a range of 0.01 to 0.99, c is in a range of 0.01 to 0.3, the sum of a, b and c is in a range of 0.8 to 1.2, and M is at least one element selected from the group consisting of Al, V, Mn, Fe, Cu and Zn, as a cathode active material having excellent self-discharge characteristics and excellent charge/discharge cyclability and capable of maintaining battery performance favorable for storage and use under high temperature conditions. The lithium/nickel complex oxide obtained using the method disclosed in the above Japanese Patent exhibits relatively high capacity compared to the lithium/cobalt complex oxide and has improved charge/discharge cyclability to a degree, but still has unsatisfactory high-temperature characteristics when in a charged state. As a result, such a lithium/nickel complex oxide initiates decomposition accompanied by release of gas such as oxygen, and the thus released gas such as oxygen reacts with an electrolyte, or nickel ions react with the electrolyte, thus leading to an elevated internal pressure of the battery which in turn results in the battery swelling or in the worst case a risk of the battery exploding.

On the other hand, in order to improve thermal stability of the battery, where it is desired to use the lithium/nickel complex oxide in which a portion of nickel (Ni) is replaced with other metal species as the cathode active material, partial replacement of nickel with the added metal can improve thermal stability, but the capacity of the battery is significantly decreased as the amount of the metal added is increased.

As such, there is a need in the art for the development of a cathode active material which has a high capacity for use in preparation of a high-capacity battery and which is also thermally stable at high temperatures, thus capable of inhibiting reaction with the electrolyte.

SUMMARY OF THE INVENTION

The present invention can realize a high capacity in a battery while improving thermal stability thereof, by provision of a cathode active material for a non-aqueous electrolyte lithium secondary battery having a specific composition.

That is, the present invention can provide a cathode active material for a non-aqueous electrolyte lithium secondary battery capable of enhancing a battery capacity in a specific composition while having a low exothermic peak due to high thermal stability and having low reactivity between the electrolyte and cathode active material at high temperatures.

In accordance with an aspect of the present invention, there is provided a cathode active material for a non-aqueous electrolyte lithium secondary battery, comprising a lithium/nickel/cobalt/manganese complex metal oxide represented by Formula 1 below:

$$Li_aNi_{1-(v+w+x+y+z)}Mn_vCo_wM_xM'_yM''_zO_2 \qquad \text{(Formula 1)}$$ 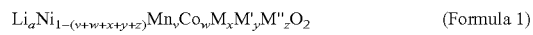

wherein M, M' and M" are independently selected from the group consisting of Al, Mg, Sr, Ca, P, Pb, Y, Zr and any combination thereof, a is in a range of 0.9 to 1.05, 1−(v+w+x+y+z) is in a range of 0.685 to 0.745, v is in a range of 0.05 to 0.06, w is in a range of 0.20 to 0.24, and x+y+z is in a range of 0.005 to 0.015.

In addition, the cathode material in accordance with the present invention can have an average particle diameter of 1 to 30 μm, a tap density of 2.0 to 2.7 g/cm³ and a spherical shape or pseudo-spherical shape.

In accordance with another aspect of the present invention, there is provided a lithium/nickel/cobalt/manganese complex metal oxide electrode, wherein the above cathode active material for a non-aqueous electrolyte lithium secondary battery is added to a solution containing a suitable binder, such as a polyvinylidene fluoride (PVDF)-based binder and a suitable conductive agent, such as a carbon-based conductive agent using a suitable solvent such as N-methylpyrrolidone (NMP) as a solvent.

In accordance with a further aspect of the present invention, there is provided a lithium secondary battery using the above complex metal oxide electrode.

In accordance with yet another aspect of the present invention, there is provided a process for preparing a cathode active material for a non-aqueous electrolyte lithium secondary battery, comprising co-precipitating a mixed metal solution composed of a nickel salt solution, a cobalt salt solution and a manganese salt solution in the presence of a complexing agent and a precipitating agent, thereby preparing a nickel/cobalt/manganese metal hydroxide; coating a surface of the resulting metal hydroxide with at least one material selected from the group consisting of Al, Mg, Sr, Ca, P, Pb, Y and Zr, and mixtures thereof, followed by mixing with a lithium salt; subjecting the mixture to heat treatment at a temperature of 300 to 900° C. for 5 to 30 hours in normal air or dry air or in an oxygen atmosphere, thereby preparing a lithium/nickel complex oxide; and firing the resulting complex oxide.

The co-precipitating process can be carried out at a pH of 11 to 12.

DESCRIPTION OF THE DRAWING

The above and other objects, features and other advantages of the present invention will be more clearly understood from the following detailed description taken in conjunction with the accompanying drawing, in which.

DETAILED DESCRIPTION OF THE INVENTION

Figure 1:
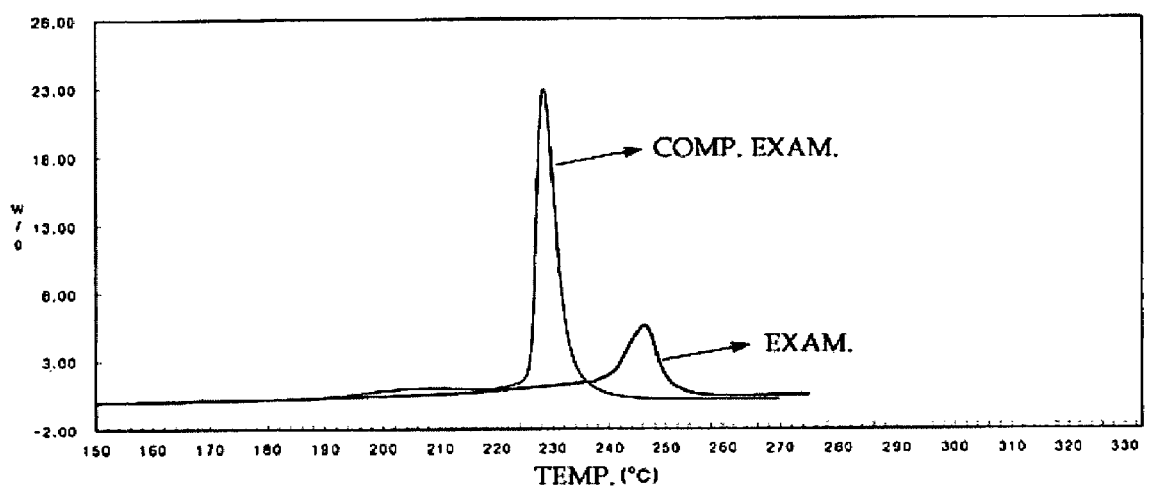
FIG. 1 is a graph showing results of DSC (Differential scanning calorimetry) on cathode active materials in accordance with Example 1 and Comparative Example 1.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a cathode active material for a non-aqueous electrolyte lithium secondary battery comprising a lithium/nickel/cobalt/manganese complex metal oxide represented by Formula 1 as described above.

The cathode active material serves to realize high capacity and high safety in the composition of Formula 1. Here, a lower content of nickel leads to a reduced capacity, while a higher content of nickel leads to a higher capacity but results in deterioration of safety. In addition, a lower content of cobalt leads to deterioration of safety, while a higher content of cobalt leads to decreased capacity and increased production costs. Further, a lower content of manganese leads to deterioration of safety, while a higher content thereof leads to deterioration of capacity and operating lifetime characteristics.

In order to prepare the cathode active material in accordance with the present invention, first, a nickel salt solution, a cobalt salt solution and a manganese salt solution are reacted with a complexing agent and a precipitating agent, thereby preparing $Ni_{1-(v+w)}Mn_vCo_w(OH)_2$. This process employs a co-precipitation reaction. More specifically, when the nickel salt solution, cobalt salt solution, manganese salt solution, complexing agent and precipitating agent are continuously supplied to a reactor, nickel, cobalt and manganese metals react with one another to form $Ni_{1-(v+w)}Mn_vCo_w(OH)_2$. The total concentration of the metal salts in the nickel salt solution, cobalt salt solution and manganese salt solution can range from 1.0 to 2.5M. When the concentration of the metal salts is less than 1.0M, an amount of the resulting material can be small, thus resulting in poor productivity. In contrast, when the concentration of the metal salts exceeds 2.5M, this may cause precipitation of the metal salts, and it can be difficult to control sizes of the particles. In this case, the reaction temperature should be above 50° C. in order to prevent precipitation of the metal salts. A suitable solvent can be water.

Examples of a suitable nickel salt may include without limitation nickel hydroxide, nickel sulfate, nickel nitrate, nickel acetate and nickel chloride, and mixtures thereof. Examples of a suitable cobalt salt may include without limitation cobalt hydroxide, cobalt sulfate, cobalt nitrate and cobalt chloride and mixtures thereof. Examples of a suitable manganese salt may include without limitation manganese acetate, manganese dioxide, manganese sulfate and manganese chloride and mixtures thereof. The temperature of the reactor may be maintained in a range of 40 to 60° C. A pH of the reactor can be maintained in a range of 11 to 12. In addition, a mixing ratio of the metal:complexing agent can be in a range of 1:0.5 to 1.3 molar ratio. Reactants in the reactor can be reacted while stirring at a rate of 200 to 1000 rpm. When the reactor used in the present invention is an overflow reactor, co-precipitates thus formed overflow from the reactor and can thus be easily separated.

After the reaction is complete, the overflowing reaction precipitates are washed with water or a weak acid solution until they became neutral and then dried to thereby prepare a nickel/cobalt/manganese hydroxide. Thereafter, one or more materials selected from Al, Mg, Sr, Ca, P, Pb, Y, Zr and any combination thereof, which correspond to M, M' and M" of Formula 1, are dissolved in water and the resulting solution is stirred with an addition of the nickel/cobalt/manganese hydroxide. When the material added is P, diammonium hydrogen phosphate $((NH_4)_2HPO_4)$ or $H_3PO_4$ can be used as a phosphorus source, and as other metal salts, nitrate, acetate and sulfate compounds and mixtures thereof may be used.

Then, the nickel/cobalt/manganese complex metal hydroxide compound is dried and classified. The resulting material is mixed with a lithium salt and subjected to a heat treatment sufficient to form a cathode active material in accordance with the present invention. Generally, the mixture can be heated at a temperature of 300 to 900° C. for 5 to 30 hours in normal air, or dry air, or in an oxygen atmosphere. As a non-limiting example, the resulting nickel/cobalt/manganese metal hydroxide compound can be mixed with a lithium salt and fired at a temperature of 400 to 600° C. in an oxygen atmosphere for 5 to 7 hours and then at a temperature of 700 to 850° C. for 10 to 20 hours, thereby preparing a cathode active material in accordance with the present invention. The lithium salt which can be used in the present invention includes, for example, and without limitation, lithium carbonate, lithium nitrate, lithium acetate, lithium hydroxide, lithium hydroxide hydrate and lithium oxide and mixtures thereof. After firing, the active material is crushed/classified to thereby prepare a final active material. The thus-prepared active material is a compound of Formula 1 having a spherical shape or pseudo-spherical shape, an average particle diameter of 1 to 30 μm, and a tap density of 2.0 to 2.7 g/cm³.

The cathode active material for a lithium secondary battery in accordance with the present invention has 1C capacity of 170 to 175 mAh/g upon 4.3 to 3.0V charge/discharge while having a heat generation rate of less than 10 W/g, thus providing excellent thermal stability.

In order to prepare a cathode for a secondary battery using the lithium/nickel/cobalt/manganese complex metal oxide in accordance with the present invention, a slurry can be prepared by adding a suitable binder, such as but not limited to a polyvinylidene fluoride (PVDF)-based binder, a suitable conductive agent, such as but not limited to a carbon-based conductive agent and the above-mentioned active material and using a suitable solvent, such as but not limited to N-methylpyrrolidone (NMP) as a solvent.

The lithium secondary battery, prepared with an electrode using the cathode active material of a lithium secondary battery prepared according to the present invention, exhibits high capacity of the battery while improving thermal stability thereof, can inhibit reactivity with the electrolyte and can also secure preparation stability.

EXAMPLES

Now, the present invention will be described in more detail with reference to the following examples. These examples are provided only for illustrating the present invention and should not be construed as limiting the scope and spirit of the present invention.

Example 1

Nickel sulfate, cobalt sulfate and manganese sulfate are mixed to prepare a solution having a nickel/cobalt/manganese ratio of 72/23/5 and a total metal concentration of 2.5M. The resulting aqueous solution of metal salts, $NH_4OH$ as a complexing agent and an aqueous solution of NaOH as a precipitating agent are continuously supplied at a constant rate to an overflow reactor which is maintained at a temperature of 40° C., using a pump. Here, the reactor is kept at a pH of 11.3 to 11.7, a molar ratio of the metal:ammonia in metal salt solutions is adjusted to 1:0.8 and reaction materials are stirred at 350 rpm, thereby resulting in continuous co-precipitation of reaction products. The thus-overflowed precipitates are washed to be neutral using deionized water, dried at a temperature of 130° C. followed by classification, thereby preparing a spherical compound of $Ni_{0.72}Co_{0.23}Mn_{0.05}(OH)_2$. Based on the resulting compound, 0.75M % of $(NH_4)_2HPO_4$ and 0.75M % of aluminum nitrate are stirred and dissolved in deionized water. Then, the spherical compound of $Ni_{0.72}Co_{0.23}Mn_{0.05}(OH)_2$ is added with stirring to the resulting solution, such that the surface of compound $Ni_{0.72}Co_{0.23}Mn_{0.05}(OH)_2$ is coated with the solution. After sufficiently stirring for 1 hour, the resulting materials are dried at 130° C., followed by classification. The dried powder and $LiOH.H_2O$ in a 1:1 molar ratio are homogeneously mixed, placed in a crucible which is then elevated to 550° C. at a rate of 2° C./min in an oxygen atmosphere and heat treated at the same temperature for 7 hours. Then, contents in the crucible are elevated to a temperature of 800° C. at a rate of 2° C./min, and fired at the same temperature for 20 hours, followed by crushing and classification to thereby obtain a lithium/nickel/cobalt/manganese complex metal oxide. The thus-obtained powder is subjected to powder XRD analysis using Cu Kα radiation. As a result, it is possible to confirm a peak of the lithium/nickel/cobalt/manganese complex metal oxide that can be assigned to a hexagonal system.

Using the cathode active material made up of the lithium/nickel/cobalt/manganese complex metal oxide, a 2016 type coin cell battery is fabricated according to the following procedure, and charge/discharge capacity thereof is measured.

96% by weight of the cathode active material is mixed with 2% by weight of a conductive agent and 2% by weight of PVDF, and NMP in an amount commonly used to prepare the battery is added to the resulting mixture, thereby forming a slurry. The resulting slurry is coated on an aluminum foil having a thickness of 20 μm using doctor blades, followed by drying to prepare a plate. Using a lithium metal as an anode and a 1.15M $LiPF_6$ EC/DMC/DEC solvent as an electrolyte, a 2016 type coin cell battery is fabricated in a glove box under argon atmosphere.

Next, after the battery thus fabricated is aged for 12 hours to stabilize the open circuit voltage (OCV), a current density for a cathode is set to 0.150 $mA/cm^2$ and then charge/discharge experiments are carried out in a range of 4.3 to 3 volts. Charge/discharge is conducted in the following order, 0.1C, 0.2C, 0.5C and 1.0C. In addition, in order to measure thermal stability of the cathode active materials prepared in Examples and Comparative Examples in accordance with the present invention, DSC (Differential scanning calorimetry) analysis is carried out as follows. Coin type half-cell batteries of Examples and Comparative Examples are charged to 4.45V and plates are separated. The active material, which is applied to the aluminum (Al) foil, is collected alone in an amount of about 2 mg and put into an aluminum sample can, and then 30 parts by weight of an electrolyte relative to the active material is introduced thereto. This is followed by sealing the can and analysis using DSC (NETCH). Then, DSC analysis is carried out by scanning at an elevation rate of 10° C./min in the range of 50° C. to 300° C. under nitrogen atmosphere. 0.1C initial discharge capacity (mAh/g) and 1.0C discharge capacity (mAh/g) for Examples and Comparative Examples are shown in Table 1 below, and experimental results on a heating value (J/g) and a heat generation rate (W/g) are shown in Table 1 and FIG. 1.

Example 2

A cathode active material is prepared in the same manner as Example 1, except that a Ni/Co/Mn composition is used in a 70/24/6 ratio.

Example 3

A cathode active material is prepared in the same manner as Example 1, except that a Ni/Co/Mn composition is used in a 74.5/20.5/5 ratio.

Comparative Example 1

A cathode active material is prepared in the same manner as Example 1, except that a Ni/Co/Mn composition is used in an 81/15/4 ratio.

Comparative Example 2

A cathode active material is prepared in the same manner as Example 1, except that a Ni/Co/Mn composition is used in a 50/20/30 ratio.

TABLE 1

|  | Ni/Co/Mn ratio | 1st discharge 0.1 C (mAh/g) | 4th discharge 1.0 C (mAh/g) | Heating value (J/g) | Heat generation rate (W/g) |
|---|---|---|---|---|---|
| Ex. 1 | 72/23/5 | 192.0 | 173 | 420 | 4 |
| Ex. 2 | 70/24/6 | 190.0 | 170 | 400 | 3 |
| Ex. 3 | 74.5/20.5/5 | 195.0 | 175 | 450 | 5 |
| Comp. Ex. 1 | 81/15/4 | 200.0 | 178 | 650 | 23 |
| Comp. Ex. 2 | 50/20/30 | 188.0 | 158 | 522 | 5 |

Capacity: 2016 type coin half-cell battery; electrolyte, EC/EMC/DEC=3/6/1 v/v, LiPF6 1.15M; 3.0 to 4.3V charge/discharge DSC: electrolyte, EC/EMC/DEC=3/6/1 v/v LiPF6 1.15M; about 4.45V charged; DSC is measured after adding 30 parts by weight of the electrolyte relative to an active material, scanning rate: 10° C./min As can be seen from Table 1, 1C capacity of the half-cell batteries of Examples 1 through 3 exhibit a high capacity ranging from 170 to 175 mAh/g and a significantly lower heating value compared to Comparative Example 1, thus showing superior thermal stability. In addition, the battery of Comparative Example 2 exhibits a relatively low heating value, but shows much lower capacity. The capacity of the battery is a critical factor which determines an energy density of the battery. The cathode active material in a charged state displays a weak metal-oxygen bond, thereby leading to generation of $O_2$ molecules due to decomposition of the bond therebetween and the generated $O_2$ molecules react with the electrolyte, thus producing a large amount of heat which is then measured as a heating value or a heat generation rate using DSC. Such heat generation is a main cause for deterioration of battery safety. Batteries of Examples 1 through 3 prepared according to the present invention exhibit a significant reduction in the heating value and heat generation rate, as compared to Comparative Example 1. Therefore, it can be seen from these results that batteries of Examples 1 through 3 have excellent thermal stability while exhibiting high capacity.

As apparent from the above description, a cathode active material in accordance with the present invention, when it is applied to a non-aqueous electrolyte secondary battery, exhibits excellent electrochemical characteristics due to high structural stability thereof, and exhibits a significantly reduced heating value and heat generation rate, thereby providing superior thermal stability leading to improved safety of the battery. A process for preparing the cathode active material in accordance with the present invention is carried out using a specific composition via co-precipitation and thus provides easy powder control and superior applicability thereof to the battery. Further, the cathode active material in accordance with the present invention exhibits a high 1C capacity of 170 to 175 mAh/g while having superior safety upon application thereof to a battery.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A cathode active material for a non-aqueous electrolyte lithium secondary battery comprising a lithium/nickel/cobalt/manganese complex metal oxide represented by Formula 1:

$$Li_aNi_{1-(v+w+x+y+z)}Mn_vCo_wM_xM'_yM''_zO_2 \qquad \text{(Formula 1)}$$

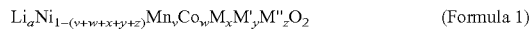

wherein M, M' and M" are independently selected from the group consisting of Al, Mg, Sr, Ca, P, Pb, Y, Zr and any combination thereof,
a is in the range of 0.9 to 1.05,
1−(v+w+x+y+z) is in the range of 0.685 to 0.745,
v is in the range of 0.05 to 0.06,
w is in the range of 0.20 to 0.24, and
x+y+z is in the range of 0.005 to 0.015.

2. The cathode active material according to claim 1, wherein the cathode active material has an average particle diameter of 1 to 30 μm, a tap density of 2.0 to 2.7 g/cm³ and a spherical shape or pseudo-spherical shape.

3. A complex metal oxide electrode comprising the cathode active material for a non-aqueous electrolyte lithium secondary battery of claim 1, a binder and a conductive agent.

4. A complex metal oxide electrode of claim 3, wherein the binder comprises a polyvinylidene fluoride (PVDF)-based binder and the conductive agent comprises a carbon-based conductive agent.

5. A complex metal oxide electrode of claim 3, wherein the cathode active material has an average particle diameter of 1 to 30 μm, a tap density of 2.0 to 2.7 g/cm³ and a spherical shape or pseudo-spherical shape.

6. A lithium secondary battery comprising the complex metal oxide electrode as set forth in claim 3.

7. A complex metal oxide electrode, produced by the process of adding the cathode active material for a non-aqueous electrolyte lithium secondary battery of claim 1 to a solution containing a polyvinylidene fluoride (PVDF)-based binder and a carbon-based conductive agent using N-methyl pyrrolidone (NMP) as a solvent.

8. A complex metal oxide electrode of claim 7, wherein the cathode active material has an average particle diameter of 1 to 30 μm, a tap density of 2.0 to 2.7 g/cm³ and a spherical shape or pseudo-spherical shape.

9. A lithium secondary battery comprising the complex metal oxide electrode as set forth in claim 7.

10. The cathode active material according to claim 1, wherein the cathode active material has a 1.0C discharge capacity ranging from about 170 to about 175 mAh/g and a thermal stability ranging from about 400 to about 450 J/g.

* * * * *

UNITED STATES PATENT AND TRADEMARK OFFICE
CERTIFICATE OF CORRECTION

PATENT NO.      : 7,625,670 B2                          Page 1 of 1
APPLICATION NO. : 11/371595
DATED           : December 1, 2009
INVENTOR(S)     : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 637 days.

Signed and Sealed this

Twenty-first Day of December, 2010

David J. Kappos
*Director of the United States Patent and Trademark Office*